Figure 3:
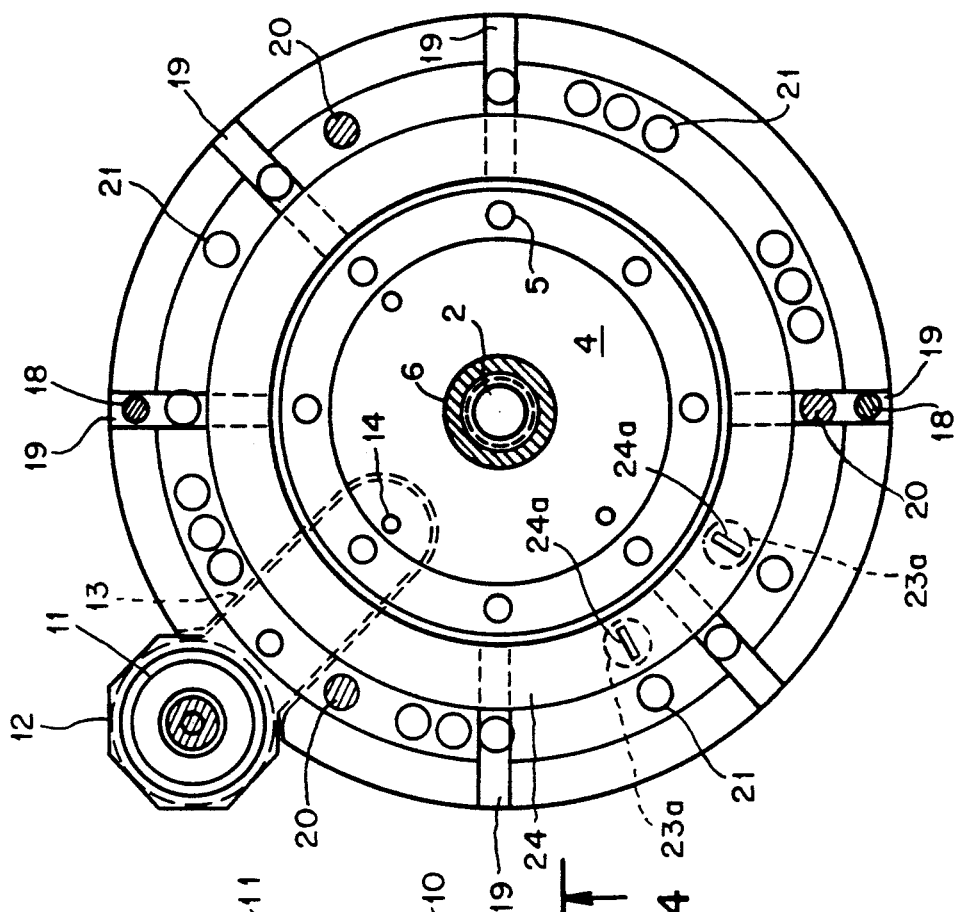

United States Patent [19]
Schafler

[11] Patent Number: 5,210,954
[45] Date of Patent: May 18, 1993

[54] CLINOMETER

[75] Inventor: Reinhard Schafler, Wasserburg, Fed. Rep. of Germany

[73] Assignee: Bergwerksverband GmbH, Essen, Fed. Rep. of Germany

[21] Appl. No.: 768,069

[22] PCT Filed: Jan. 18, 1991

[86] PCT No.: PCT/EP91/00087
§ 371 Date: Nov. 27, 1991
§ 102(e) Date: Nov. 27, 1991

[87] PCT Pub. No.: WO91/11684
PCT Pub. Date: Aug. 8, 1991

[30] Foreign Application Priority Data
Jan. 29, 1990 [DE] Fed. Rep. of Germany ....... 4002493

[51] Int. Cl.$^5$ .............................................. G01C 9/16
[52] U.S. Cl. .............................................. 33/366; 33/351
[58] Field of Search ............... 33/366, 316, 324, 319, 33/320, 322, 333, 351, 352

[56] References Cited
U.S. PATENT DOCUMENTS
3,490,153 1/1970 Harris ..................................... 33/352
3,762,062 10/1973 Johnston ................................ 33/321

FOREIGN PATENT DOCUMENTS
2922412 3/1982 Fed. Rep. of Germany .

Primary Examiner—Harry N. Haroian
Attorney, Agent, or Firm—Collard & Roe

[57] ABSTRACT

A gradient indicator has a clinometer arranged on a motor-driven turntable allows reversible measurements to be taken and supports the gradient indicator in precisely reproducible positions on bearing faces of the base in the various measurement positions. In addition, the turntable can tilt by a precisely defined angle in the direction of two diametrically opposed calibration axes. Movement of the turntable and evaluation of the measurement results are ensured by a microprocessor. Successive reversible measurements in the measurement and calibration axes allow automatic sensing of measurement values to be obtained with high and constant measurement precision, large measurement range and automatic calibration of the zero-point, scaling factor and gravity g.

18 Claims, 5 Drawing Sheets

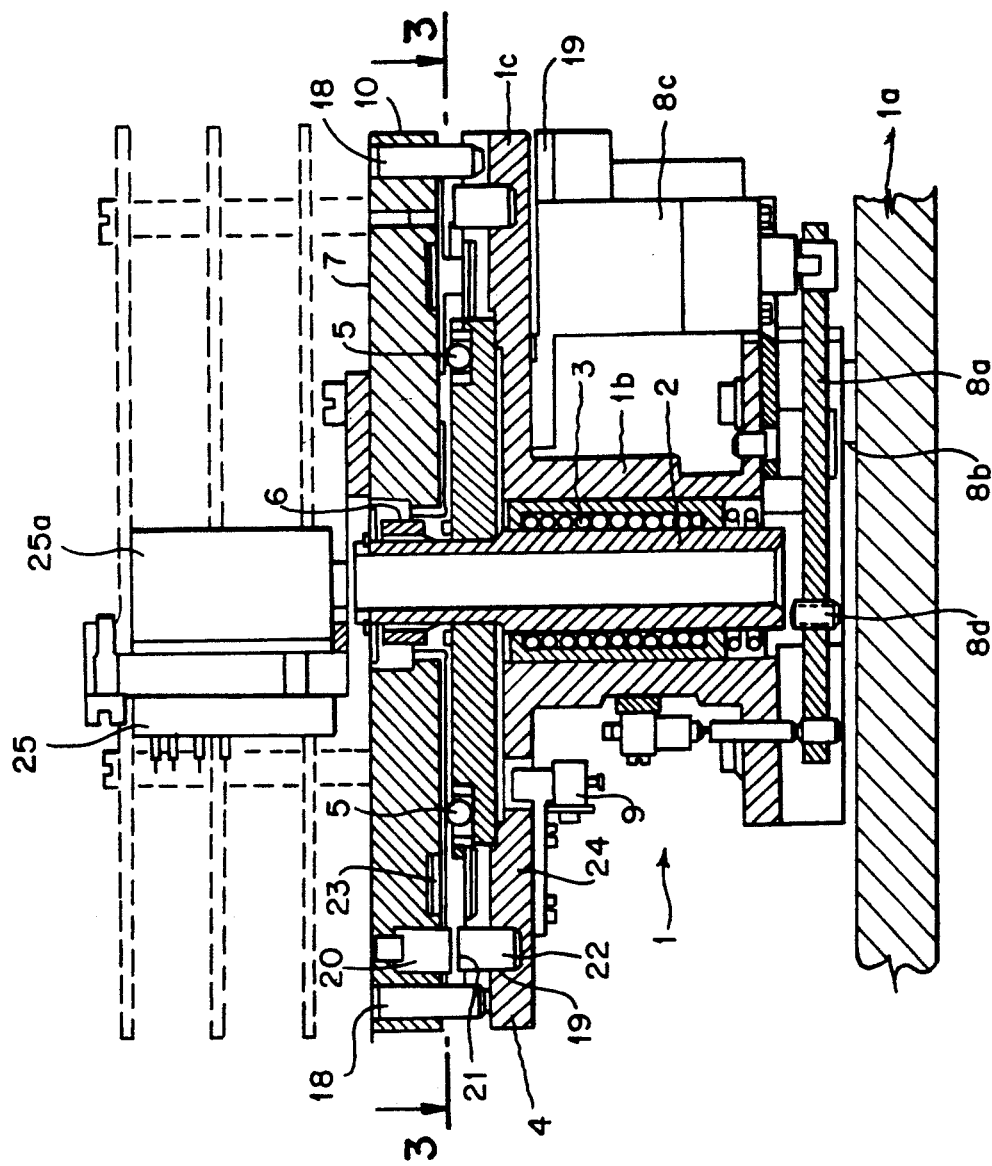

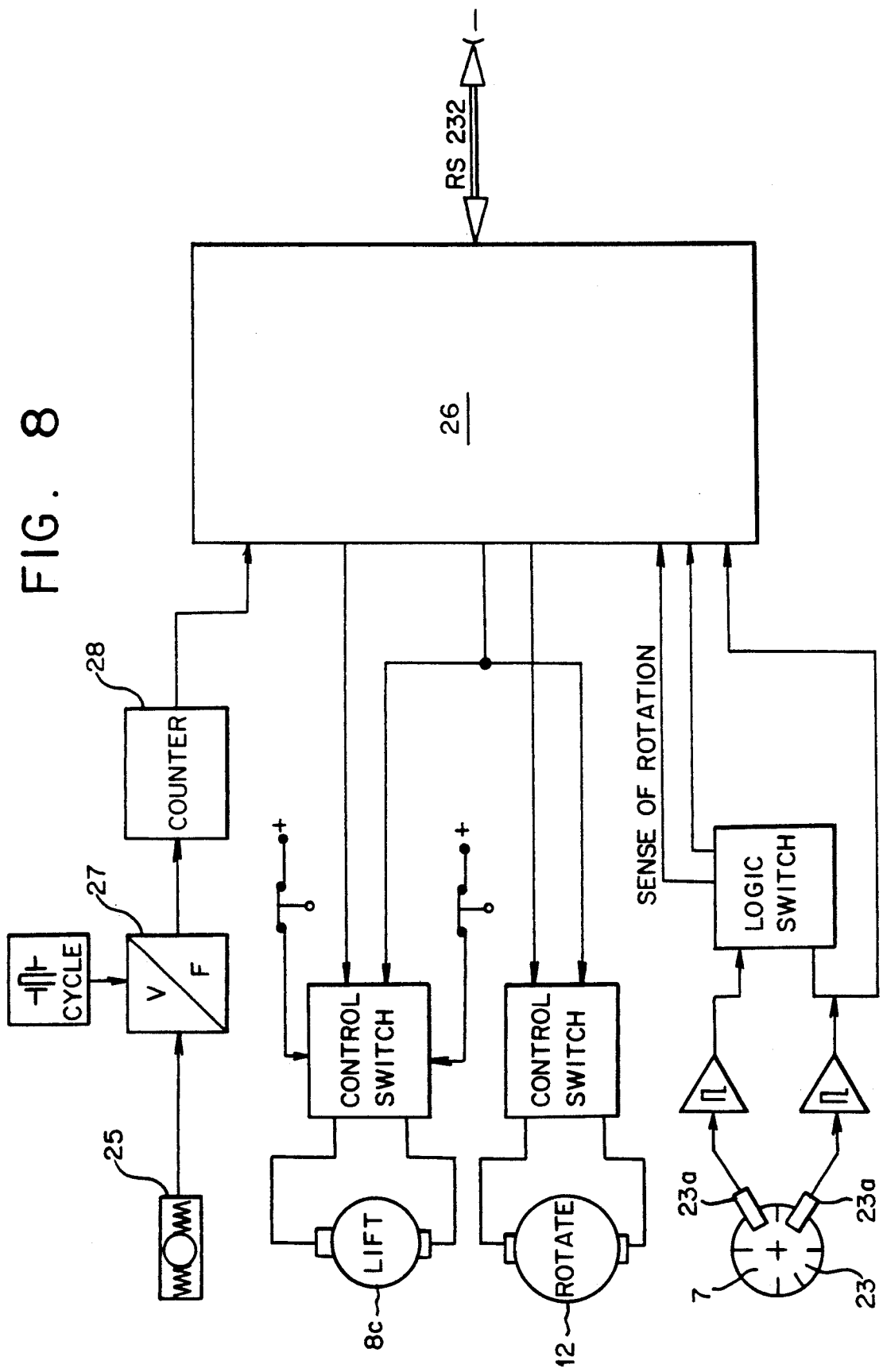

CLINOMETER

The invention relates to a gradient indicator for determining the inclination of structures, systems or machines sensitive to inclination, with a base, on which a carrier plate carrying at least one clinometer can be supported by means of three bearing feet, in measurement positions which are rotated by 180° in each case, in the direction of measurement axes X+ and X−, and Y+ and Y−, where guide devices are assigned to the base, which guide the bearing feet of the carrier plate into defined, reproducible positions when they are set on the bearing faces of the base.

The known devices of the type stated are provided with clinometers of varying construction, such as pendulum clinometers, power accelerometers, or electrolyte levels. All these clinometers demonstrate changes due to age, in addition to temperature-dependent zero point drifts and scaling factor changes, which are of random nature and cannot be modeled. In order to eliminate this defect, and when the demand for accuracy is high, so-called reversible measurements are carried out in two positions, offset by 180°, and the inclination is determined by forming the difference of the individual measurement values. With devices of the type stated initially (cf. brochure of Westfälische Berggewerkschaftskasse, "Elektronische Setzlibelle ESL2a mit 2-achsiger Einpassung" [Electronic Striding Level ESL2a with 2-axis fitting]), these reversible measurements are carried out discretely, by manually setting the carrier plate down on the base, and changing its position. However, only zero-point changes of the clinometer can be eliminated with such reversible measurements, but changes in scaling factor cannot. In order to keep the error influence of the scaling factor changes and that of gravity g, which differs from one location to another, to a minimum, only small gradients can be measured. This has the consequence that the base has to be placed in a very precise horizontal position when installed, and that only small gradients can be detected with sufficient accuracy.

Another disadvantage consists of the fact that manually carrying out the measurements makes continuous detection of gradient changes extremely difficult and labor-intensive. The measurement results are dependent, to a very significant degree, on the careful work of the measurement personnel. Since the base is exposed for inclination measurements, the measurements can also be falsified by dirt deposits.

It is therefore the task of the invention to improve the device of the type stated initially, in such a way that automatic acquisition of measurement values, with consistently high accuracy of measurement values, a large measurement range and self-calibration of zero point, scaling factor and gravity g, is made possible.

To accomplish this task, the invention proposes, proceeding from the device of the type stated initially, that the carrier plate is structured as a turntable, which is mounted on the base so as to rotate around an axis of rotation, and tilt relative to the axis of rotation, and to be raised and lowered in the longitudinal direction of the axis of rotation, where motor-driven rotation and lifting devices are assigned to the turntable, and that the base has further bearing faces to support the turntable in two additional measurement positions, offset from one another by 180°, in the direction of calibration measurement axes K+ and K−, which form an angle, particularly of 45°, with the measurement axes X+ and X−, and Y+ and Y−, where the bearing faces lying in alignment with the calibration measurement axes K+ and K− are raised or lowered relative to all other bearing faces lying in a common plane, by a fixed amount, and run parallel to the common plane, and that the rotation and lifting devices and the clinometer are connected to a microprocessor, to control the movements of the turntable in the different measurement positions and to record and evaluate the measurement values measured by the clinometer.

First of all, the device according to the invention has the advantage that it functions fully automatically, both in the acquisition of measurement values, and in the calibration of the zero point and the scaling factor which becomes necessary at regular intervals. The reversible measurements required for this, in the measurement axes X+ and X−, and Y+ and Y−, as well as the calibration measurement axes K+ and K−, are automatically controlled and evaluated by the microprocessor, in the correct sequence. In this connection, the table which can be moved by means of the motor-driven rotation and lifting device, in combination with the precisely defined bearing faces of the base, and the guide devices, allows defined, precisely reproducible measurement positions to be automatically taken. Calibration of the zero point and the scaling factor takes place using measurement values determined by mathematical operations of the microprocessor. In the measurement positions assigned to the calibration measurement axes K+ and K−, the turntable is given precisely defined, reproducible tilts, due to the different heights of the bearing faces, which are used as base values for calibration of the scaling factor. For calibration of the scaling factor, the changes in gravity g, which are dependent on the measurement location, are also detected.

An advantageous further development of the invention provides that the clinometer has two measurement axes which run at right angles to one another. This makes it possible to keep the number of measurements required, and the number of bearing faces of the base, to a minimum.

Furthermore, in addition to the clinometer, a gyroscopic measurement device for determining north can also be arranged on the turntable. By arranging the gyroscopic measurement device on the turntable, zero point corrections and new determinations of scale factor can also be carried out for this device, with simple reversible measurements at defined angles of rotation. With this additional device, the apparatus can determine the three spacial axes of the Cartesian system automatically and with great accuracy.

It is practical if the turntable has the shape of a round, circular disk, and if it is provided with gear teeth on the circumference, engaging with the drive pinion of a rotating motor, which is mounted on an extension arm which can swivel parallel to the plane of the turntable, which can be raised and lowered together with the turntable, and is guided relative to the base in such a way that the position of the rotating motor with reference to the axis of rotation of the turntable is fixed in the raised position and has play in the lowered position. This makes it possible to keep the motor and the turntable in a sufficiently precise position relationship when the turntable is raised, which ensures that the drive pinion of the rotating motor engages perfectly with the gear teeth of the turntable. In contrast, in the lowered position of the turntable, this position relationship is released, so that the turntable can move into the position determined by the guide devices and the bearing faces, without being hindered by the drive pinion of the rotating motor.

It is practical if the guide devices have fixation pins arranged at the bottom of the turntable, projecting downward, which engage with grooves located on the base, assigned to the individual measurement positions, and fix the turntable exactly in the rotation position assigned to the measurement position in each case. It is practical if these fixation pins have a cone-shaped tip, so that they are introduced into the grooves by themselves, after the turntable has first been brought into the approximately correct rotation position by means of the rotating motor.

To control the rotation movements of the turntable, measurement markers for optical scanning of the rotation position are arranged on the bottom, distributed over the circumference. The optical measurement device makes it possible to control the rotating motor of the turntable in such a way that the turntable always takes the approximately correct rotation position before being lowered.

It is practical if the optical measurement device assigned to the base has two reflection photoeyes and a ring disk with two light gaps arranged above it, for monitoring the direction of rotation. The bearing feet of the turntable have lower end faces in spherical shape, while the bearing faces of the base are structured as lapped frontal faces of pins. The spherical bearing feet and the lapped frontal faces of the pins allow great accuracy in manufacture, on the one hand. On the other hand, spherical bearing feet press into the lapped frontal faces only slightly, and produce uniform elastic deformations, which can be calculated, at all frontal surfaces. It is advantageous if the lifting device demonstrates a lever which can be moved by means of a lifting motor, which is mounted on the base and acts from below on an axle element connected with the turntable, which is mounted in the base so as to be adjustable in the direction of the axis of rotation. Such a lifting device allows lifting and lowering movement guided with sufficient precision.

The axle element connected with the turntable is hollow in structure and serves as an installation channel for electrical lines leading to the top of the turntable. This results in sufficiently protected housing of these lines, which are important for the ability to function.

Using limit switches assigned to the base, the lifting movement of the lifting device can be limited in the up and down direction, in simple manner.

In order to be able to digitally evaluate the signals generated by the clinometer, a voltage frequency converter for analog-digital conversion and a 16-bit counter are assigned to the clinometer. It is practical if the microprocessor, the voltage frequency converter and the 16-bit counter are arranged in the protective housing of the apparatus. This avoids long signal lines.

It is practical if the microprocessor is provided with an RS-232 interface for output of the measurement values determined and for receiving control signals.

The clinometer is preferably structured as an accelerometer. Such accelerometers provide accurate measurement values over a large measurement range and are particularly insensitive to the influence of vibration and shock.

Figure 2:
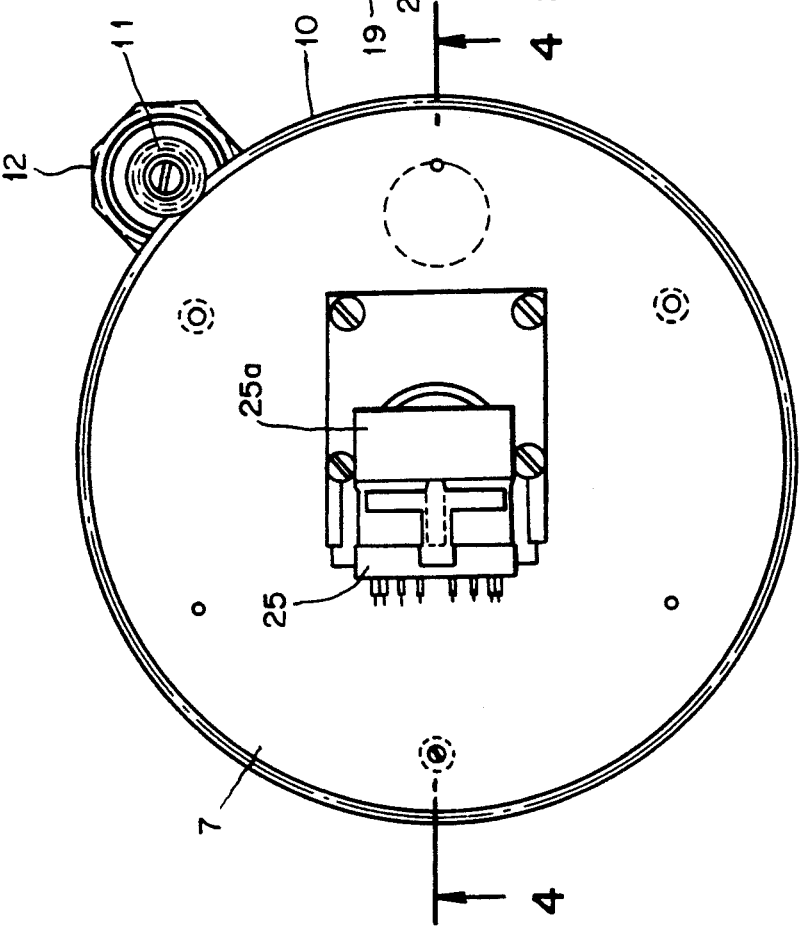
Figure 5:
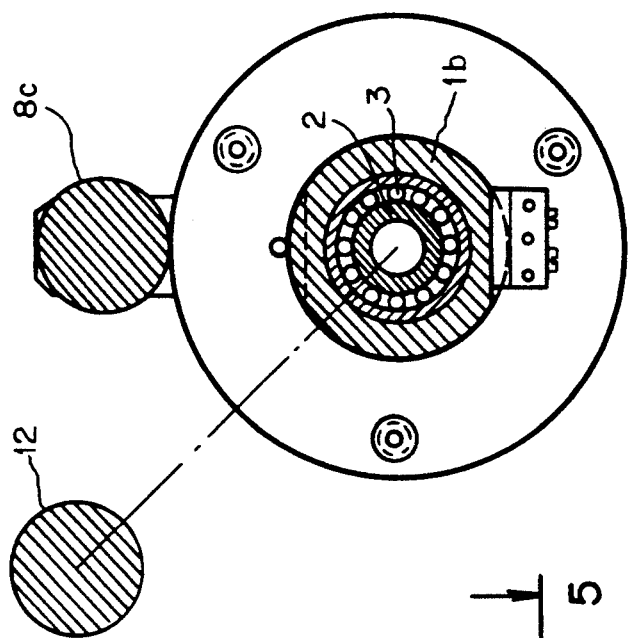
Figure 4:
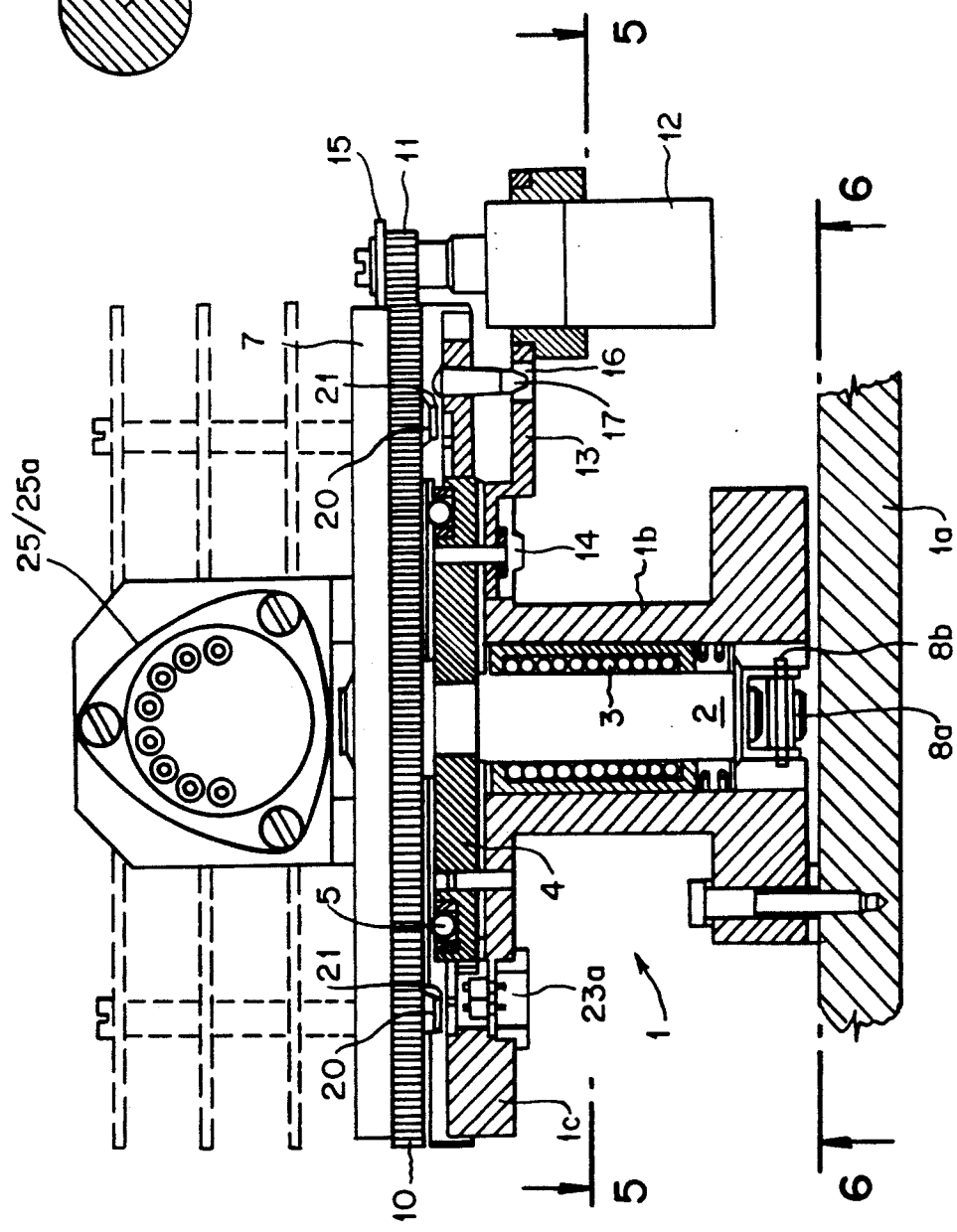
Figure 6:
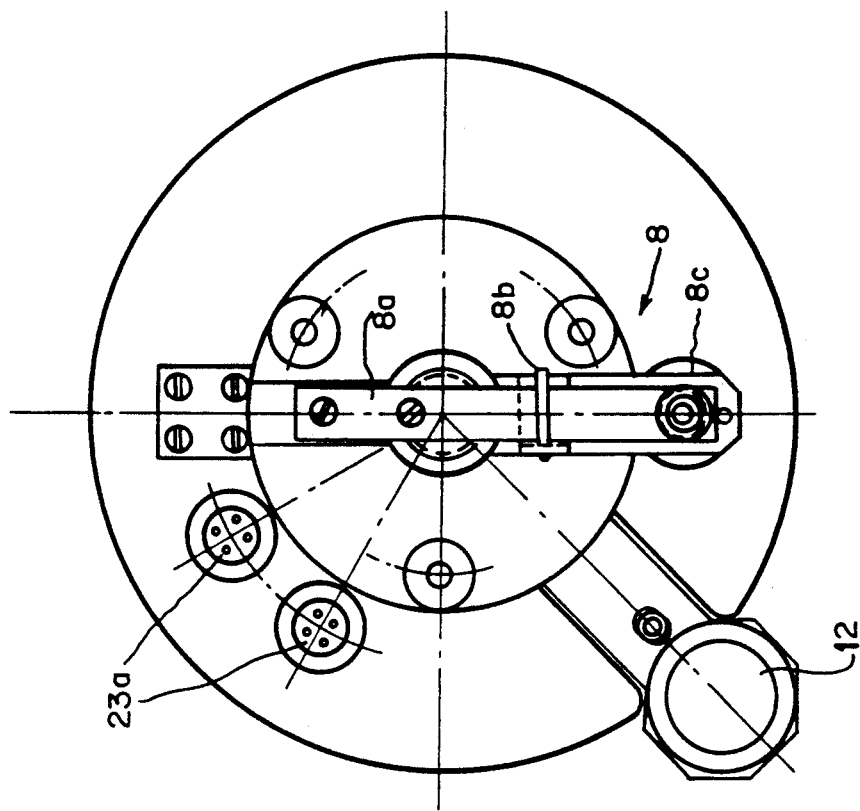
Figure 7:
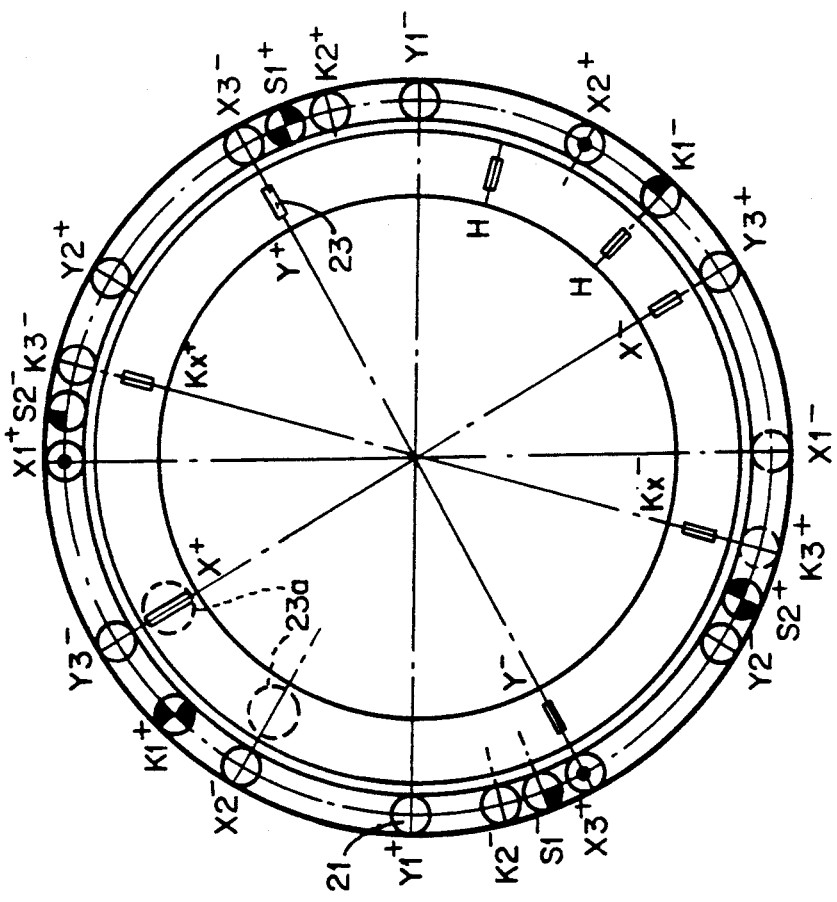

An embodiment of the invention is explained in greater detail in the following, using the drawings. These show:

FIG. 1: a vertical cross-section through the apparatus according to the invention, along the axis of rotation of the turntable;
FIG. 2: a top view for FIG. 1;
FIG. 3: a cross-section along the line 3—3 in FIG. 1, i.e. a top view of the base;
FIG. 4: a vertical cross-section through the base, with a side view of the turntable, where the rotating motor is shown displaced by along line 4—4 of FIG. 2;
FIG. 5: a cross-section along the line 5—5 in FIG. 4;
FIG. 6: a cross-section along the line 6—6 in FIG. 4;
FIG. 7: a top view of the base, in schematic representation;
FIG. 8: a block wiring diagram of the apparatus.

In the drawings, the base is designed, as a whole, with the reference symbol 1. It consists of a base plate 1a, which can be connected with the structure to be measured, if necessary. On the top of the base plate 1a, a standpipe 1b is attached; this is provided with a circular flange plate 1c on the top.

An axle element 2 with a hollow structure is mounted so as to be adjustable in its longitudinal direction, in the standpipe 1b. In order to achieve easy longitudinal movement of the axle element 2, it is supported against the inside wall of the standpipe 1b by means of a ball bearing guide 3. Below the upper end of the axle element 2, it is rigidly provided with a bearing disk 4, which has bearing balls 5 which rotate easily mounted on the top.

At its upper end, the axle element 2 is provided with a rotation bearing 6, which serves to mount a turntable 7 so it can rotate; this turntable is structured as a circular disk. The rotation bearing 6 allows not only free rotation of the turntable 7 around the vertical axis of rotation, but also tilting of the turntable 7 on all sides, relative to its axis of rotation.

The lower end of the axle element 2 has a lifting device 8 assigned to it. This lifting device 8 has a two-arm lever 8a, which is mounted on the base 1 so as to pivot around a horizontal pivot axis 8b, and with the setting element of a lifting motor 8c engaging with the one lever arm; this motor is also attached to the base 1. The other lever arm of the lever 8a acts on the lower end of the axle element 2 via an adjustable bearing bolt 8d, specifically in such a manner that the axle element 2 and the turntable 7 mounted on it can be lifted vertically, out of the lowered position shown in the drawing, into a raised position. In this raised position, the bearing balls 5 of the bearing disk 4 support the turntable 7 from below. In the lowered position, in contrast, the turntable is supported against bearing feet on the base 1, as will be explained in greater detail below. The lifting movements of the lifting device 8 are limited, in the up and down direction, by limit switches 9 located on the base 1.

The turntable 7 is furthermore provided with gear teeth 10 on its outside circumference, with which the drive pinion of a rotating motor 12 engages. The rotating motor 12 is attached to an extension arm 13, which is mounted on the base 1 so as to pivot around a vertical pivot axis 14 and so it can be raised and lowered in the vertical direction. The drive pinion 11 of the rotating motor 12 is provided with a bearing disk 15 on its frontal side which faces upward, which disk rests against the turntable 7 from above, so that the rotating motor 12 and the extension arm 13 which carried it make the same lifting movements as the turntable. The extension arm 13 is provided with a fixation opening 16, into which a fixation pin 17 connected with the base 1 engages from above. This fixation pin 17 has a conical form at its lower end, specifically in such a way that the extension arm 13 is aligned on the fixation pin 17 during lifting. In this manner, the extension arm 13 and the rotating motor 12 are fixed in place relative to the axis of rotation of the turntable 7 when the turntable 7 is raised, so that the drive pinion 11 can mesh perfectly with the gear teeth 10 on the outside of the turntable. In the lowered position, in contrast, the fixation pin 17 releases the extension arm 13, so that the turntable 7 can align itself on the base 1 without being hindered by the rotating motor 12.

The turntable 7 is provided with two diametrically opposite fixation pins 18 on the bottom, which engage with radially extending grooves 19 arranged on the top of the flange plate 1c of the base 1. In the embodiment, a total of six such grooves 19, i.e. three pairs of grooves 19, is provided, which are assigned to the measurement axes X±, Y± and K±. The fixation pins 18 are formed to be conical at the lower end, so that they guide the turntable 7 into the predetermined rotation position during lowering.

In addition, the turntable 7 is provided with three bearing feet 20 in the bottom, which can be set onto level bearing faces 21 of the base 1, assigned to the base 1. The bearing feet 20 have a spherical shape at the bottom, so that precisely defined and reproducible point contact occurs between the bearing feet 20 and the bearing faces 21. The level bearing faces 21 are each formed from lapped frontal faces of pins 22, which are embedded in the base 1. By means of the lapped frontal faces 21 in combination with the spherical bearing feet 20, a contact reproducibility of less than 0.0001 mm is achieved. At a base length of 80 mm, this corresponds to a gradient reproducibility of less than 0.25 seconds of angle. In the embodiment, a total of twenty-two such bearing faces 21 is provided (cf. FIG. 7). Eighteen of the bearing faces 21 are assigned to the six measurement axes, specifically:

1. the bearing faces X1+, X2+, X3+ are assigned to the measurement axis X+,
2. the bearing faces X1−, X2−, X3− are assigned to the measurement axis X−,
3. the bearing faces Y1+, Y2+, Y3+ are assigned to the measurement axis Y+,
4. the bearing faces Y1−, Y2−, Y3− are assigned to the measurement axis Y−,
5. the bearing faces K1+, K2+, K3+ are assigned to the calibration measurement axis K+,
6. the bearing faces K1−, K2−, K3− are assigned to the calibration measurement axis K−.

The measurement axes X± and Y± run at right angles to one another. The calibration measurement angles K± run at an angle of 45° to the measurement axes X± and Y± respectively. The bearing faces assigned to the measurement axes X± and Y± lie in a common plane. The bearing faces K2+ and K3+ as well as K2− and K3− assigned to the calibration measurement axes K± also lie in the same plane. The bearing face K1+, i.e. the bearing face which lies in the alignment of the calibration measurement axis K+, is raised relative to the common plane mentioned above, by a certain, fixed amount, and runs parallel to this common plane, where the parallelism error is not supposed to amount to more than 20 seconds of angle. The bearing face K1−, i.e. the bearing face which lies in the alignment of the calibration measurement axis K−, is lowered relative to the common plane mentioned above, by a certain, fixed amount, and also runs parallel to this common plane, where the parallelism error is not supposed to amount to more than 20 seconds of angle. As a result of this special arrangement of the bearing faces K1+ and K1−, the turntable 7 is tilted by a precisely defined, reproducible amount, when it is aligned to the calibration axes K+ and K−; this amount is used as the base value for calibration of the scaling factor. In addition to the bearing faces already listed, the base 1 also has four more bearing faces S1+ and S2+ as well as S1− and S2−. These bearing faces serve as auxiliary faces in production, calibration of the bearing faces K1+ and K1−, and for a final parallelism check.

To control the rotating motor 12, measurement markers 23 are provided on the bottom of the turntable 7, distributed over the circumference, which can be scanned by means of two reflection photoeyes 23a located on the top of the flange plate 1c. Between the reflection photoeyes 23a and the turntable 7, there is a shutter ring 24 with two light slots 24a. In addition to the measurement markers 23 assigned to the different rotation positions, there are two more home measurement markers 23a on the turntable 7, which generate a home impulse after completion of the measurement series.

A clinometer 25 is arranged on the top of the turntable 7. It is practical if this clinometer 25 is structured as an accelerometer; it operates either in one measurement axis or in two measurement axes which run perpendicular to one another. In addition, a gyroscopic measurement device 25a for determining north can be affixed on the turntable 7. Furthermore, a microprocessor 26, a voltage frequency converter 27 for digitalization of the values measured by the clinometer 25, a 16-bit counter 28 and various logic circuits are arranged in the protective housing, not shown in greater detail, of the apparatus as a whole. The electrical lines required for signal transmission run through the axle element 2, which is hollow.

The block wiring diagram shown in FIG. 8 shows the structural composition of the control circuit, which has a microprocessor 26 with a serial RS232 interface for output of the measurement data and input of control commands as the central control unit. The accelerometer 25 is connected to the microprocessor 26 via the voltage frequency converter 27 and the 16-bit counter 28. As is furthermore evident from the block wiring diagram, the microprocessor also controls the lifting motor 8c and the rotating motor 12. Control and monitoring of the various rotation positions of the turntable 7 takes place using the reflection photoeyes 23a and the measurement markers 23.

The apparatus according to the invention functions as follows:

For a determination of the zero point error and for a new determination of the scaling factor of the clinometer 25, the turntable 7 is rotated to the various rotation positions, one after the other, at predetermined time intervals, and a gradient measurement value is determined over a certain time period in every position. To move the turntable 7, it is lifted by the lifting device 8, until the limit switch 9 responds, and subsequently turned to the approximate location of the new rotation position, using the rotating motor 12 and the optical scanning of the measurement markers 23. The turntable contains the exact rotation position during lowering, when the fixation pins 18 engage with the grooves 19. When the bearing feet 20 are set down on the lapped bearing faces 21, the turntable 7 aligns with great accuracy, by tilting around its axis of rotation in the predetermined plane in each case. From the gradient values determined in the measurement locations in each instance, the required zero point corrections and corrections of the scaling factor can be calculated using suitable algorithms. The microprocessor automatically carries out these calculations at predetermined time intervals.

If a two-axis clinometer 25, which functions in two measurement axes which run perpendicular to one another, is used in place of a single-axis clinometer 25, a reversible measurement is not as necessary, so that the number of required bearing points is reduced by six.

Instead of the accelerometer used in the embodiment, other clinometers can also be used, such as pendulum clinometers or electrolyte levels.

Using the gyroscopic measurement device, the position of the measurement axes relative to the north direction can be determined, if necessary. The required zero point corrections and new determinations of the scaling factor for this measurement device are carried out in the same manner as described above, with reversible measurements with precisely defined angles of rotation, in each case.

I claim:

1. Gradient indicator for determining the inclination of structures, systems or machines sensitive to inclination, comprising:
    a base having bearing faces;
    a carrier plate on said base carrying at least one clinometer which is supported by three bearing feet in measurement positions which are rotated by 180° in each case;
    measurement axes X+ and X−, and Y+ and Y−;
    guide devices assigned to the base which guide the bearing feet of the carrier plate into defined, reproducible positions when they are set on the bearing faces of the base;
    said carrier plate comprising a turntable which is mounted on said base so as to rotate around an axis of rotation, and tilt relative to the axis of rotation, and to be raised and lowered in a longitudinal direction of the axis of rotation;
    motor-drive means for rotation of said turntable and lifting device for raising and lowering the turntable;
    said base having further bearing faces to support the turntable in two additional measurement positions, offset from one another by 180°, in the direction of calibration measurement axes K+ and K−, which forms an angle with the measurement axes X+ and X−, and Y+ and Y−;
    means for raising or lowering the bearing faces lying in alignment with the calibration measurement axes K+ and K− relative to all other bearing faces lying in a common plane, by a fixed amount, and run parallel to the common plane; and
    a microprocessor to which are connected the rotation device, the lifting device and the clinometer to control the movements of the turntable in the different measurement positions and to record and evaluate the measurement values measured by the clinometer.

2. Apparatus according to claim 1, wherein the clinometer has two measurement axes which run at right angles to one another.

3. Apparatus according to claim 1, further comprising in addition to the clinometer, a gyroscopic measurement device for determining north also being arranged on the turntable.

4. Apparatus according to claim 1, wherein the clinometer comprises an accelerometer.

5. Apparatus according to claim 1, wherein the turntable comprises a round, circular disk having a circumferences, and is provided with gear teeth on the circumference;
    a rotating motor having a drive pinion engaging with the gear teeth;
    said rotating motor mounted on an extension arm;
    said extension arm swivelable parallel to the plane of the turntable, said extension arm raisable to a raised position and lowerable to a lowered position, together with the turntable, and said extension arm guided relative to the base in such a way that the position of the rotating motor with reference to the axis of rotation of the turntable is fixed in the raised position and has play in the lowered position.

6. Apparatus according to claim 1, wherein said base has grooves; and
    wherein the guide devices have fixation pins arranged at the bottom of the turntable, projecting downward, which engage with the grooves located on the base, assigned to the individual measurement positions, and fix the turntable exactly in the rotation position assigned to the measurement position in each case.

7. Apparatus according to claim 6, wherein the turntable has a bottom and has a circumference; and
    wherein measurement markers for optical scanning the rotation position are arranged on the bottom of the turntable, distributed over the circumference.

8. Apparatus according to claim 6, wherein the optical measurement device has two reflection photo eyes assigned to the base and a shutter ring arranged above it, with two light gaps.

9. Apparatus according to claim 1, wherein the turntable has bearing feet which have lower end faces of spherical shape; and
    wherein the base has bearing faces structured as lapped frontal faces of pins.

10. Apparatus according to claim 1, wherein the lifting device has a lever; and
    a lifting motor for moving said lever; said lifting motor mounted on the base and acting from below on an axle element connected with the turntable which is mounted in the base so as to be adjustable in the direction of the axis of rotation of the turntable.

11. Apparatus according to claim 10, wherein the axle element is hollow in structure and serves as an installation conduit for electrical lines leading to the top of the turntable.

12. Apparatus according to claim 11, wherein limit switches are assigned to the base which limit the lifting movements of the lifting device in the up and down direction.

13. Apparatus according to claim 1, wherein a voltage frequency converter for analog-digital conversion, and a 16-bit counter are assigned to the clinometer.

14. Apparatus according to claim 13,
further comprising a protective housing; and
wherein the microprocessor, the voltage frequency converter and the 16-bit counter are arranged in the protective housing of the apparatus.

15. Apparatus according to claim 14,
wherein the microprocessor is provided with a serial RS-232 interface for output of the measurement values determined and for receiving control signals.

16. Method for the calibration of the scaling factor of clinometers, comprising
first, determining the zero point error by reversible measurements in the measurement axis X+ and X−, as well as a Y+ and Y−; and
subsequently redetermining the scaling factor (sk) by means of a reversible measurement in the calibration measurement axes K+ which has a known positive gradient, permanently adjustable on a measurement device, and K− which has a known negative gradient, permanently adjustable on the measurement device, using the known zero point error, the known gradients and the measured values.

17. Method according to claim 16,
wherein the calibration measurement axis K+ runs at an angle to the measurement axes X+ and X−, as well as Y+ and Y−, and that before a new determination of the scaling factor (sk) the zero point deviations measured in the measurement axis systems X+ and Y+ are transformed to the calibration measurement axis system K+.

18. Method according to claim 17,
wherein the angle is 45°.

* * * * *